(12) United States Patent
Zeng

(10) Patent No.: US 6,952,493 B2
(45) Date of Patent: Oct. 4, 2005

(54) SYSTEM AND METHOD FOR GAMUT MAPPING USING A COMPOSITE COLOR SPACE

(75) Inventor: Huanzhao Zeng, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 639 days.

(21) Appl. No.: 09/773,478

(22) Filed: Jan. 31, 2001

(65) Prior Publication Data

US 2002/0150289 A1 Oct. 17, 2002

(51) Int. Cl.[7] ............................................. G06K 9/00
(52) U.S. Cl. ................................... 382/162; 358/518
(58) Field of Search ............................ 382/162, 167; 358/1.9, 518, 519, 520; 345/590, 603, 604

(56) References Cited

U.S. PATENT DOCUMENTS

| | | | | |
|---|---|---|---|---|
| 5,317,426 A | * | 5/1994 | Hoshino | 358/515 |
| 5,583,666 A | * | 12/1996 | Ellson et al. | 358/518 |
| 6,285,784 B1 | | 9/2001 | Giorgianni et al. | |
| 6,437,792 B1 | * | 8/2002 | Ito et al. | 345/600 |
| 6,480,299 B1 | * | 11/2002 | Drakopoulos et al. | 358/1.9 |
| 6,532,081 B1 | * | 3/2003 | Cecchi et al. | 358/1.9 |
| 6,546,132 B1 | * | 4/2003 | Bhattacharjya et al. | 382/167 |
| 6,633,407 B1 | * | 10/2003 | Kim et al. | 358/1.9 |

FOREIGN PATENT DOCUMENTS

| | | |
|---|---|---|
| EP | 0991019 A | 4/2000 |
| JP | 11341297 | 3/2000 |
| WO | WO 9858493 | 12/1998 |

OTHER PUBLICATIONS

Vandenbroucke et al, Color Pixels Classification in an Hybrid Color Space, Proceedings of the 1998 International Conference on Image Processing, Oct. 4–7, 1998, vol. 1, pp. 176–180.*

Roy S. Berns, Billmeyer and Saltzman Principles of Color Technology, John Wiley & Sons, Inc, 3rd ed, 2000, pp. 194–197.*

Zeng, Huanzhao; "Gamut Mapping in Multiple Color Spaces"; Part of the IS&T/SPIE Conference on Color Imaging: Device–Independent Color, Color Hardcopy, and Graphic Arts V; San Jose, California; SPIE vol. 3963; pp. 301–306; Jan. 2000.

Moroney, Nathan; "A Comparison of CIELAB and CIECAM97s"; IS&T/SID The Sixth Color Imaging Conference: Color Science, Systems, and Applications; Scottsdale, Arizona; vol. 6; Nov. 1998; pp. 17–21; ISBN/ISSN: 0–89208–213–5.

Hunt Dr. R.W.G.; "Measuring Colour" Third Revised Edition; Fountain Press, England; pp. 63–65, 317–318; Apr. 1998; ISBN: 0 86343 387 1.

\* cited by examiner

Primary Examiner—Yon J. Couso

(57) ABSTRACT

A system and method are provided for color processing. According to one embodiment, the method includes the steps of defining a composite color space in a memory of a computer system, the composite color space having a number of color space portions and a number of transition portions between adjacent ones of the color space portions, and, converting an input color space representation of a color into a composite color space representation of the color in the computer system. The method may further comprise the step of gamut mapping the color in the composite color space to an output color space.

16 Claims, 4 Drawing Sheets

SYSTEM AND METHOD FOR GAMUT MAPPING USING A COMPOSITE COLOR SPACE

TECHNICAL FIELD

The present invention is generally related to the field of color processing and, more particularly, is related to a system and method for gamut mapping using a composite color space.

BACKGROUND OF THE INVENTION

In recent years, much research has addressed various approaches for gamut mapping. Different color spaces and different gamut mapping techniques have been investigated to improve the accuracy of gamut mapping to achieve perceptually pleasing results in the reproduction of images. The limitations of different color spaces on gamut mapping have been addressed in many publications. Most of the literature discusses the concept of gamut mapping in a single color space. Different approaches have been suggested and implemented to address problems of inaccurate color reproduction. Specifically, various existing color spaces that are employed in gamut mapping may not render various colors accurately in resulting images after gamut mapping.

For example, in some color spaces a blue shift problem occurs due to gamut mapping for particular devices. In particular, an example of the blue shift problem may exist when an image with the blue color that is depicted on a display screen is printed out on a printer. Often the blue in the printed image has more of a purple or violet appearance. This is the case, for example, assuming that the image is displayed on the display screen in an RGB (Red-Green-Blue) color space and the printer employs a CMYK (cyan-magenta-yellow-black) color space.

In another approach to address such problems, gamut mapping may be accomplished in multiple color spaces in parallel. While a multiple color space approach to gamut mapping may solve some problems or limitations with gamut mapping in a single color space, the implementation of such an approach is relatively complex and complicated. For example, multiple color space approaches involve gamut mapping in each of the multiple color spaces. In addition, various functions and parameters are necessary to decide what color space(s) to select for rendering and for smooth transition between color spaces. Unfortunately, these functions and parameters require significant processing resources resulting in undue time delays, etc.

SUMMARY OF THE INVENTION

In light of the foregoing, a system and method are provided for color processing. In one embodiment, the system includes a processor circuit having a processor and a memory. Stored on the memory and executable by the processor is logic to define a composite color space, the composite color space having a number of color space portions and a number of transition portions between adjacent ones of the color space portions. The system further includes logic to convert an input color space representation of a color into a composite color space representation of the color. The system may also include logic to perform gamut mapping of the color in the composite color space to obtain a representation of the color in the composite color space that is reproducible by an output device.

The present invention also includes a method for color processing. In this regard, the method comprises the steps of defining a composite color space in a memory of a computer system, the composite color space having a number of color space portions and a number of transition portions between adjacent ones of the color space portions, and, converting an input color space representation of a color into a composite color space representation of the color in the computer system. The method may further comprise the step of gamut mapping the color in the composite color space to obtain a representation of the color in the composite color space that is reproducible by an output device.

The present invention also includes a computer program embodied on a computer readable medium for color processing. In this regard, the present invention comprises logic to define a composite color space, the composite color space having a number of color space portions and a number of transition portions between adjacent ones of the color space portions. The computer program also includes logic to convert an input color space representation of a color into a composite color space representation of the color. The computer program may further include logic to perform gamut mapping of the color in the composite color space to obtain a representation of the color in the composite color space that is reproducible by an output device.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
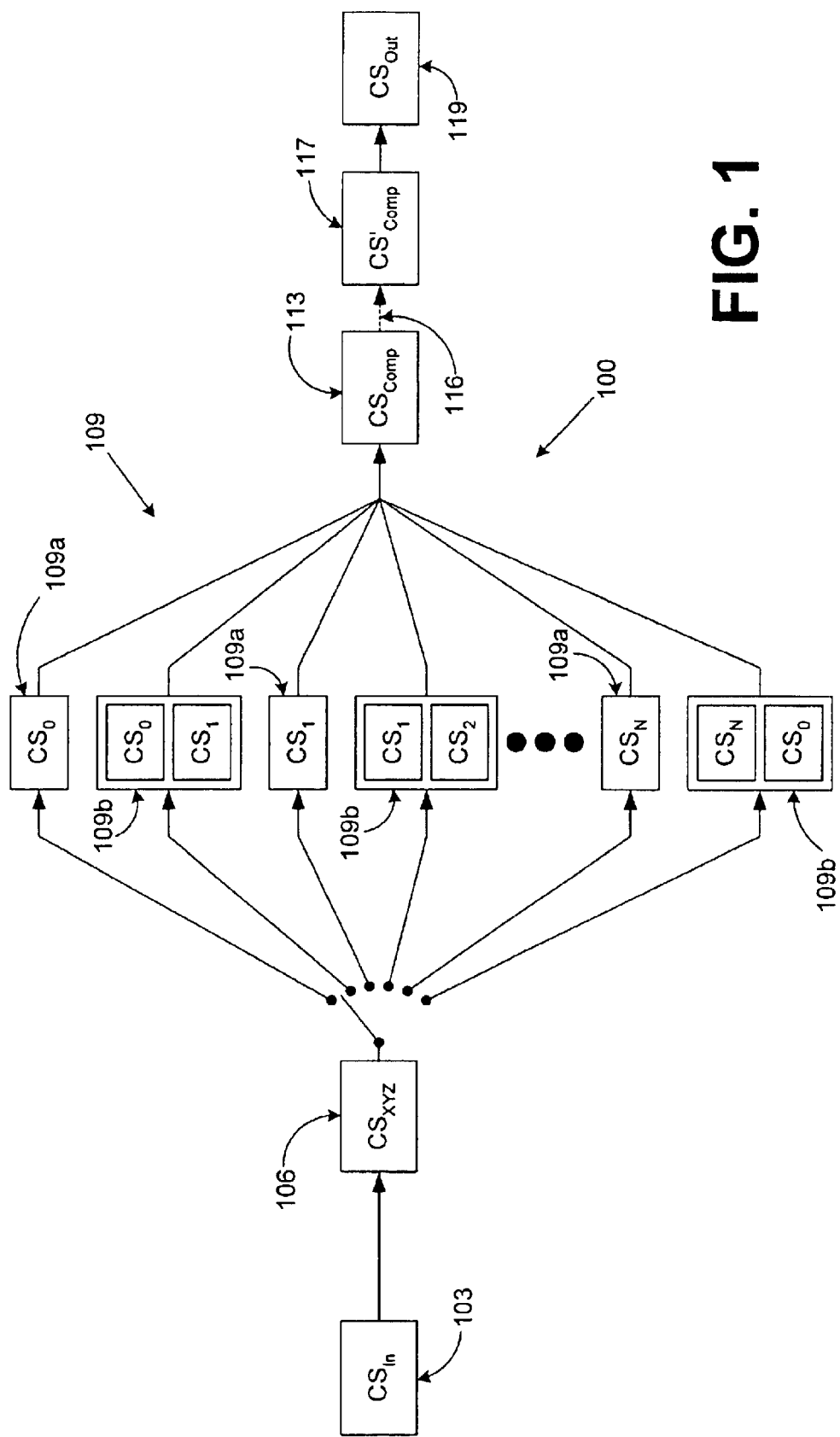
FIG. 1 is a functional block diagram of gamut mapping approach using a composite color space according to the present invention.

With reference to FIG. 1, shown is a functional block diagram of a gamut mapping approach 100 according to an embodiment of the present invention. The gamut mapping approach 100 advantageously employs a composite color space as will be described. In the gamut mapping approach 100, a color is represented in an input color space 103 for conversion. The input color space 103 may be, for example, a device-dependent color space employed to display an image on a display device such as a display screen, etc. In such a case, the input color space 103 may be, for example, a red-green-blue (RGB) color space or other color space as is generally understood by those with ordinary skill in the art.

To begin, the color that is represented in the input color space 103 is converted into a device independent XYZ color space 106 that is generally known to those with ordinary skill in the art. There are several different device independent color spaces that may be employed as the XYZ color space 106 as will be discussed. The XYZ color space 106 represents a color in a rectangular coordinate system as generally understood by those with ordinary skill in the art. Each color in the XYZ color space 106 includes chroma values from which a hue angle θ may be calculated and a brightness as is generally known by those with ordinary skill in the art. Once the color is represented in the XYZ color space 106, then a particular color space conversion 109 is identified to convert a color from the XYZ color space 106 to a composite color space 113. There a number of different color space conversions 109 that may be employed to make this conversion as will be discussed. These different color space conversions 109 may generally be categorized into two types, namely, non-transitional color space conversions 109a and transitional color space conversions 109b.

The non-transitional color space conversions 109a generally involve converting the representation of a color in the XYZ color space 106 to a predetermined color space that is directly employed as a portion of the composite color space 113 as will be discussed. The transitional color space conversions 109b generally involve converting the representation of the color in the XYZ color space 106 into a hybrid color space. The hybrid color space is a combination of representations of the same color in two different color spaces that are adjacent to each other in the composite color space. The resulting hybrid color space is included in the composite color space 113 as a transition portion as will be discussed. Once a color is transitioned to the composite color space 113, a gamut mapping function 116 is performed, resulting in a representation of the color in the composite color space 117 that can be produced by an ultimate output device. Thereafter, the representation of the color is converted into a device-dependent output color space 119 that may be applied, for example, to an output device as is generally known by those with ordinary skill in the art. For example, the input color space 103 may be the RGB color space and the output color space 119 may be CMYK color space as is generally known by those with ordinary skill in the art.

Figure 2:
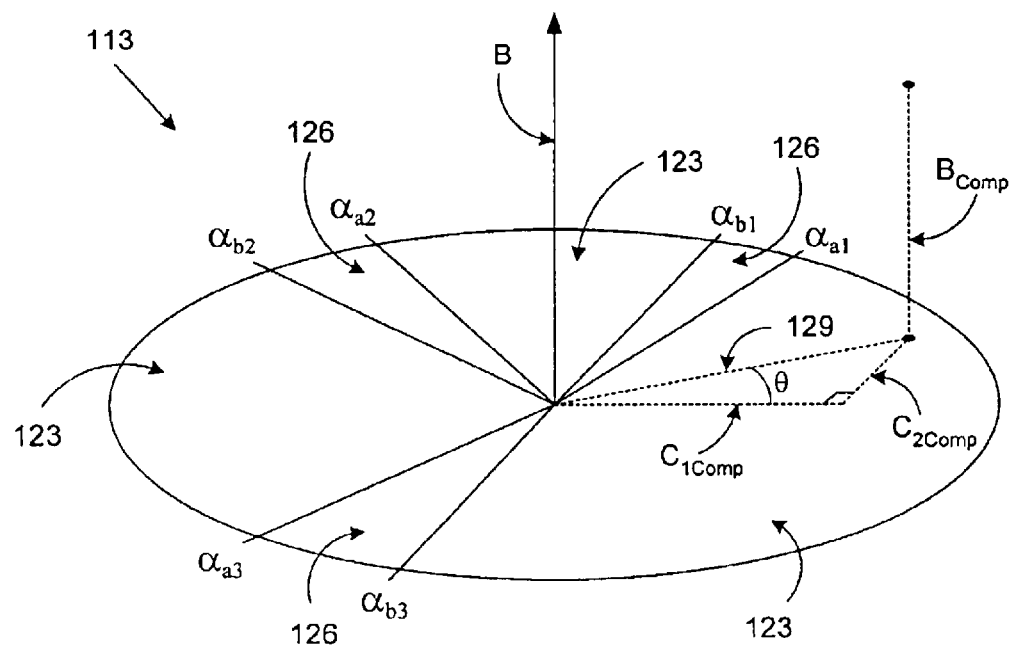
FIG. 2 is a drawing of a composite color space, for example, employed in the gamut mapping approach of FIG. 1.

With reference then to FIG. 2, shown is a graphical depiction of the composite color space 113 according to an embodiment of the present invention. The composite color space includes color space portions 123 and transition portions 126. Each of the color space portions 123 comprises a component of a different predetermined color space. The transition portions 126 serve to provide a transition between two adjacent color space portions 123. In this sense, the transition portions 126 comprise a hybrid of the adjacent color space portions 123. For example, the transition portions 126 may be a weighted sum of the adjacent color space portions 123 or may be determined in some other manner. Note that the brightness B is shown as a vertical line extending from the center of the composite color space 113. To a plot a particular color on the composite color space 113, two chroma values are employed, namely, $C_{1Comp}$ and $C_{2Comp}$ that form a right angle. The hypotenuse of the right angle 129 represents the chroma value of the particular color in question. The hue angle θ may be found by taking the inverse tangent of the chroma values $C_{2Comp}$ and $C_{1Comp}$. The brightness associated with a particular color is expressed in terms of $B_{Comp}$. Thus, the representation of a color in the composite color space 113 is expressed with values for the brightness $B_{Comp}$, and the chroma values $C_{1Comp}$ and $C_{2Comp}$, i.e. $(B_{Comp}, C_{1Comp}, C_{2Comp})$.

Next a discussion of the mathematical definition of a composite color space 113 is provided. Note that the composite color space may be defined within the memory of a computer system as will be discussed. To begin, an input color space representation of a color is denoted as $CS_{in}=(B_{Comp}, C_{1Comp}, C_{2Comp})$. A representation of a color in the composite color space is denoted as $CS_{Comp}=(B_{Comp}, C_{1Comp}, C_{2Comp})$. The input color space representation of a color is converted to a device-independent color space $CS_{XYZ}=(X, Y, Z)$. Examples of such a color space are those that have been specified by the Commission Internationale de L'Eclairage (CIE) which is the international Commission on lighting that sets forth recommendations for photometry and colorimetry. Particular device-independent color spaces specified by the CIE include CIE XYZ created in 1931, CIE L*a*b* created in 1976, CIE L*u*v* created in 1976, and CIE CAM97s Jab created in 1997.

Each of the color space representations directly employed in the composite color space $CS_{Comp}$ within each of the color space portions 123 is denoted as $CS_i=(B_i, C_{1i}, C_{2i})$. Each of the color spaces, $CS_1$, is a function of the XYZ color space denoted as $f(X_i, Y_i, Z_i)$.

To begin the conversion of the representation of a color in the input color space $CS_i$ is converted to the XYZ color space in terms of coordinates $X_i, Y_i, Z_i$. From these coordinates, the hue angle θ is calculated as the arctangent of the ration of two chroma coordinates $Y_i/X_i$, assuming that X and Y are the chroma coordinates and Z is a brightness or lightness component. Once the hue angle θ is known, then it is compared to a number of ranges of hue angles to determine the color space conversion 109 (FIG. 1) that is to be performed. To provide an example, the color space portions 123 and transition portions 126 of the composite color space 113 are discussed below. It is understood that the following provides one illustration of the color conversions for one example of a composite color space 113 and that a multitude of different composite color spaces 113 with varying numbers of color space portions 123 and transition portions 126 may be created to suit specific purposes.

Assuming that the hue angle associated with a particular color is $\alpha_{b1} \leq \theta \leq \alpha_{a2}$, then $CS_{Comp}=CS_0$. In such case, $CS_{XYZ}$ is converted to $CS_0$ that is used verbatim in the composite color space $CS_{Comp}$ for the specified range of hue angles θ.

If $\alpha_{a2} \leq \theta \leq \alpha_{b2}$, then the $CS_{XYZ}$ values are converted to both $CS_0$ values $(B_0, C_{10}, C_{20})$ and $CS_1$ values $(B_1, C_{11}, C_{21})$. Thereafter, the composite color space values $(B_{Comp}, C_{1Comp}, C_{2Comp})$ are calculated using a weighting function, for example, as follows:

$$B_{Comp}=wB_0+(1-w)B_1;$$

$$C_{1Comp}=wC_{10}+(1-w)C_{11};$$

and $$C_{2Comp}=wC_{20}+(1-w)C_{21},$$

where $$w=\left(\frac{1}{2}\right)\left[\cos\left(\frac{\theta-\alpha_{a2}}{\alpha_{a2}-\alpha_{b2}}\pi\right)+1\right].$$

If $\alpha_{b2} \leq \theta \leq \alpha_{a3}$, then $CS_{Comp}=CS_1$. In such case, $CS_{XYZ}$ is converted to $CS_1$ that is used verbatim in the composite color space $CS_{Comp}$ for the specified range of hue angles θ.

If $\alpha_{a3} \leq \theta \leq \alpha_{b3}$, then the $CS_{XYZ}$ values are converted to both $CS_1$ values ($B_1$, $C_{11}$, $C_{21}$) and $CS_2$ values ($B_2$, $C_{12}$, $C_{22}$). Thereafter, the composite color space values ($B_{Comp}$, $C_{1Comp}$, $C_{2Comp}$) are calculated using a weighting function, for example, as follows:

$$B_{Comp} = wB_1 + (1-w)B_2;$$

$$C_{1Comp} = wC_{11} + (1-w)C_{12};$$

and $$C_{2Comp} = wC_{21} + (1-w)C_{22},$$

where $$w = \left(\frac{1}{2}\right)\left[\cos\left(\frac{\theta - \alpha_{a3}}{\alpha_{a3} - \alpha_{b3}}\pi\right) + 1\right].$$

If $\alpha_{b3} \leq \theta \leq \alpha_{a1}$, then $CS_{Comp} = CS_2$. In such case, $CS_{XYZ}$ is converted to $CS_2$ that is used verbatim in the composite color space $CS_{Comp}$ for the specified range of hue angles $\theta$.

If $\alpha_{a1} \leq \theta \leq \alpha_{b1}$, then the $CS_{XYZ}$ values are converted to both $CS_2$ values ($B_2$, $C_{12}$, $C_{22}$) and $CS_0$ values ($B_0$, $C_{10}$, $C_{20}$). Thereafter, the composite color space values ($B_{Comp}$, $C_{1Comp}$, $C_{2Comp}$) are calculated using a weighting function, for example, as follows:

$$B_{Comp} = wB_2 + (1-w)B_0;$$

$$C_{1Comp} = wC_{12} + (1-w)C_{10};$$

and $$C_{2Comp} = wC_{22} + (1-w)C_{20},$$

where $$w = \left(\frac{1}{2}\right)\left[\cos\left(\frac{\theta - \alpha_{a1}}{\alpha_{a1} - \alpha_{b1}}\pi\right) + 1\right].$$

There are a number of different color spaces that may be employed for the color space portions CSi. For example, these color spaces include CIE XYZ, CIE L*a*b*, CIE L*u*v*, and CIE CAM97s Jab as well as other color spaces.

The use of several different color spaces within the composite color space $CS_{Comp}$ provides distinct advantages. Specifically, almost all color spaces inaccurately represent a range of colors as perceived, for example, by the naked eye. Examples of gamut mapping problems that exist in various color spaces include the blue shift problem, skin tones that are too red or too saturated, or gradients in some hue angles may be compressed or expanded too much. The use of the composite color space $CS_{Comp}$ according to the present invention addresses such problems by employing certain portions of various color spaces that provide an accurate representation of color as perceived, for example, by the naked eye. For example, in the case that a particular color space has weaknesses for certain ranges of hue angles, then a different color space is used for that range of hue angles that does not have the same problem, etc. Alternatively, various portions of color spaces may be employed within the composite color space to obtain desired effects during color space conversion, etc. In addition, the transition portions 126 provide a smooth transition between any two adjacent color space portions 123.

Figure 3:
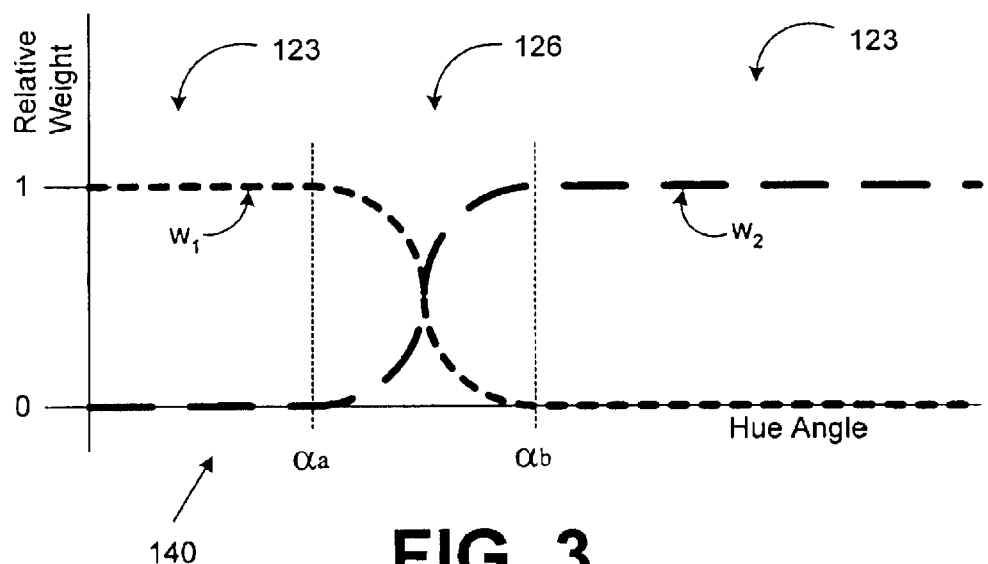
FIG. 3 is a graph depicting a weighting of adjacent color spaces in the composite color space of FIG. 2 in a transition portion thereof.

With reference to FIG. 3, shown is a weighting graph 140 according to an aspect of the present invention. The weighting graph 140 provides an example of a relative weight provided to a particular color space employed in a color space portion 123 with respect to the hue angle $\theta$. The space between the angles of $\alpha_a$ and $\alpha_b$ denotes a transition portion 126. The weights $w_1$ and $w_2$ provide the relative weight of two adjacent color space portions 123 as the transition occurs in the transition portion 126. Note however, that the relative weighting of the color spaces within a transition portion 126 may be accomplished using other ratios or equations, etc., other than those discussed above. The relative weighting within the transition portions 126 may or may not be proportional to the hue angle $\theta$. The actual mathematical approach used in calculating the hybrid color space within the transition portions 126 may be determined based upon a desired effect to the resulting colors that fall within the transition portions 126. Thus, one skilled in the art thus may specify the particular weighting approach based on the specific application.

Figure 4:
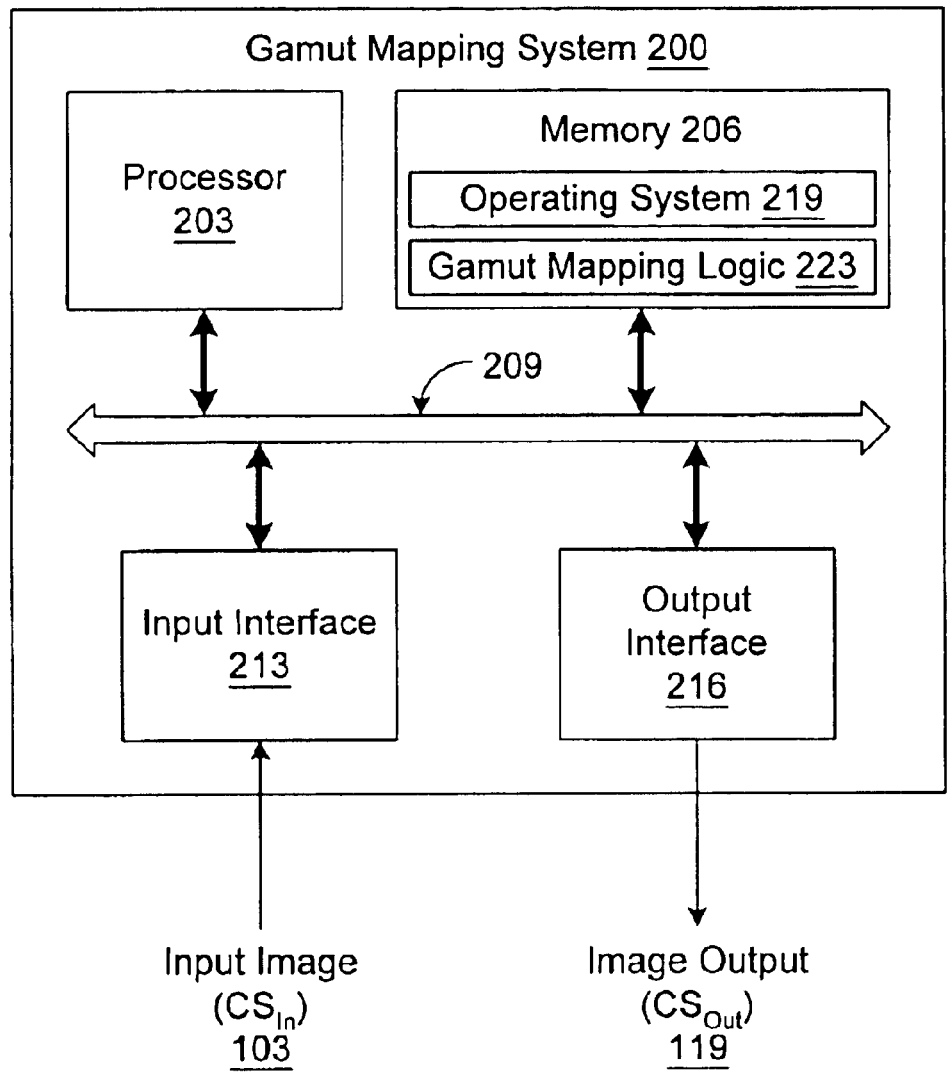
FIG. 4 is a block diagram of a gamut mapping system that employs the gamut mapping approach of FIG. 1.

With reference to FIG. 4, shown is an example of a gamut mapping system 200 according to an aspect of the present invention. The gamut mapping system 200 includes a processor circuit with a processor 203 and a memory 206, both of which are coupled to a local interface 209. The local interface may be, for example, a database with an accompanying control-bus as is generally understood by those with ordinary skill in the art. In this regard, the gamut mapping system 200 may comprise a computer system, for example, or other suitable device. The gamut mapping system 200 also includes an input interface 213 and an output interface 216, both of which are coupled to the local interface 209. The input interface 213 may be coupled, for example, to a peripheral device or other system in order to receive an input image that embraces the input color space 103 (FIG. 1). Alternatively, the input image may actually reside on the memory 206. Likewise, the output interface 216 may be coupled to an output peripheral that is employed to display the image output in the output color space 119 (FIG. 1).

The memory 206 may include both volatile and nonvolatile memory components. Volatile components are those that do not retain data values upon loss of power. Nonvolatile components are those that retain data upon a loss of power. Thus, the memory 206 may comprise, for example, random access memory (RAM), read-only memory (ROM), hard disk drives, floppy disks accessed via an associated floppy disk drive, compact disks accessed via a compact disk drive, magnetic tapes accessed via an appropriate tape drive, and/or other memory components, or a combination of any two or more of these memory components.

In addition, the processor 203 may represent multiple processors and the memory 206 may represent multiple memories that operate in parallel. In such a case, the local interface 209 may be an appropriate network that facilitates communication between any two of the multiple processors or between any processor and any of the memories, etc. The local interface 209 may facilitate memory to memory communication as well. The processor 203, memory 206, and local interface 209 may be, for example, electrical or optical in nature. Also, the memory 206 may be magnetic in nature.

The various peripheral devices that may be coupled to the local interface 209 via the input and output interfaces 213 and 216 may include, for example, a keypad, touch pad, touch screen, microphone, scanner, mouse, joystick, or one or more push buttons, etc. User output devices may include display devices, indicator lights, speakers, printers, etc. Specific display devices may be, for example, cathode ray tubes (CRT), a liquid crystal display screens, a gas plasma-based flat panel displays, light emitting diodes, etc.

Stored on the memory 206 and executable by the processor 203 is an operating system 219 and gamut mapping logic 223 according to an aspect of the present invention. The operating system 219 is executed by the processor 203 to control the general functionality of the gamut mapping system 200 as is generally known by those with ordinary skill in the art. The gamut mapping logic 223 and the operating system 219 may be distinct, for example, as shown. Alternatively, the gamut mapping logic 223 may be part of the operating system 219 to help perform the functions of displaying and otherwise rendering various images in one or more color spaces using various peripherals as discussed above.

Figure 5:
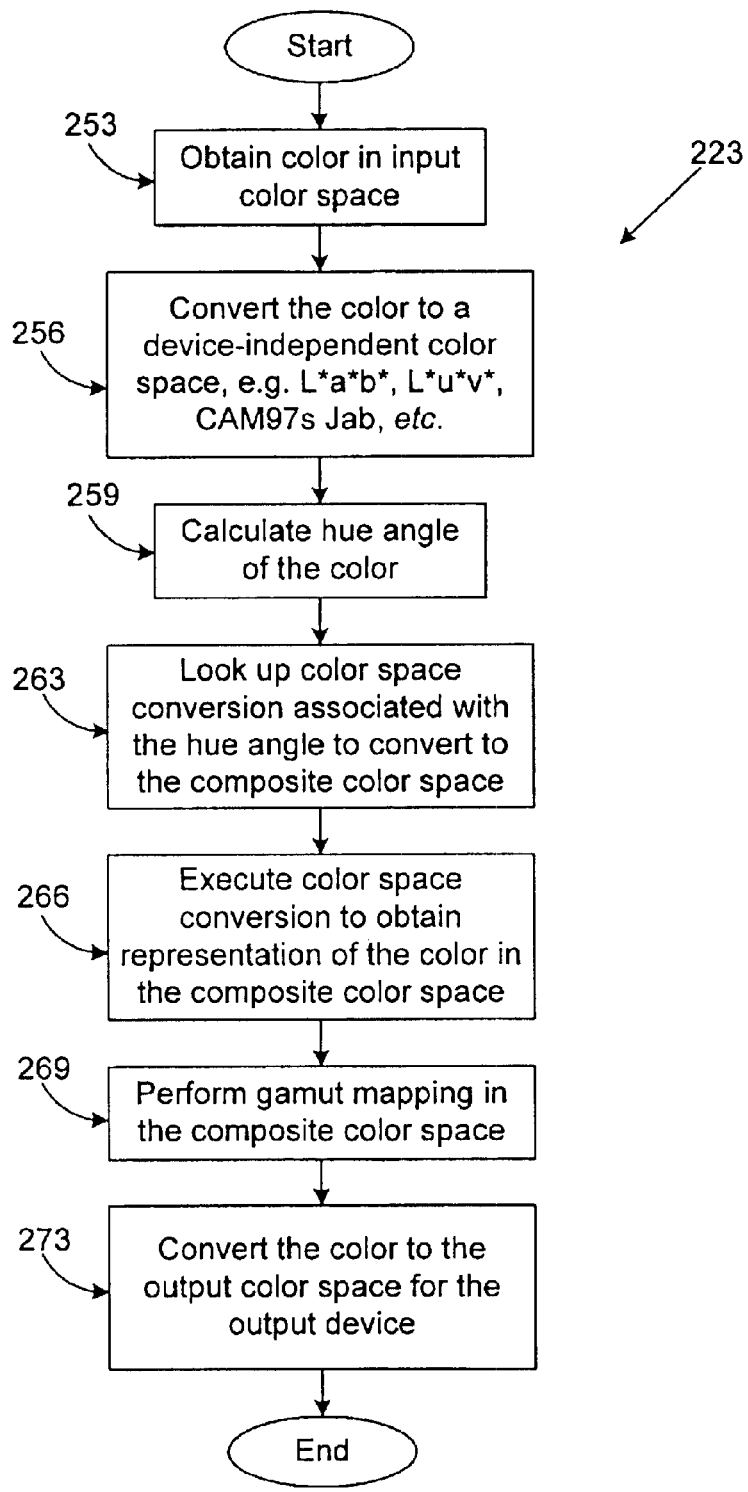
FIG. 5 is a flow chart of the gamut mapping logic employed in the gamut mapping system of FIG. 3.

With reference to FIG. 5, shown is a flow chart of the gamut mapping logic 223 according to an aspect of the present invention. The gamut mapping logic 223 is executed to convert a color represented in the input color space 103 (FIG. 1) into a representation of the same color in the output color space 119 (FIG. 1). Beginning with block 253, the color represented in the input color space 103 is obtained from the memory 206, etc. Thereafter, in block 256 the representation of the same color in the input color space 103 is converted to a representation of the same color in the device-independent XYZ color space. Then, in block 259 the hue angle θ of the color represented in the XYZ color space is calculated. In block 263, the appropriate color space conversion 109 that is associated with the particular hue angle θ determined in block 259 is identified. This color space conversion 109 is employed to convert the representation of the color space in the XYZ color space to a representation of the same color in the composite color space 113 (FIG. 1).

Next, in block 266, the color space conversion 109 identified in block 263 is executed to obtain a representation of the color in the composite color space 113. Thereafter in block 269, the gamut mapping function 116 performs gamut mapping in the composite color space 113 so that colors from the input device represented in the composite color space 113 are mapped to corresponding colors for the ultimate output device in the mapped composite color space 117. The task of gamut mapping from the composite color space 113 to the mapped composite color space 117 is performed in a manner similar to gamut mapping accomplished in different color spaces. Consequently, the gamut mapping function 116 is not discussed herein in detail.

The gamut mapping logic 223 then continues to block 173 in which a conversion from the mapped composite color space 117 to the device-dependent output color space 119 is performed. After block 173, the gamut mapping logic 223 ends. Note, however, that the gamut mapping logic 223 may be executed repeatedly for different colors as an image is translated from the input color space 103 to the output color space 119 as is generally understood by those with ordinary skill in the art.

Although the gamut mapping logic 223 (FIG. 5) of the present invention is embodied in software executed by general purpose hardware as discussed above, as an alternative the gamut mapping logic 223 may also be embodied in dedicated hardware or a combination of software/general purpose hardware and dedicated hardware. If embodied in dedicated hardware, the gamut mapping logic 223 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIG. 5 shows the architecture, functionality, and operation of an implementation of the gamut mapping logic 223. If embodied in software, each block may represent a module, segment, or portion of code that comprises one or more executable instructions to implement the specified logical function(s). If embodied in hardware, each block may represent a circuit or a number of interconnected circuits to implement the specified logical function(s). Although the flow chart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. It is understood that all such variations are within the scope of the present invention. Also, the flow chart of FIG. 5 is relatively self-explanatory and is understood by those with ordinary skill in the art to the extent that software and/or hardware can be created by one with ordinary skill in the art to carry out the various logical functions as described herein.

Also, the gamut mapping logic 223 can be embodied in any computer-readable medium for use by or in connection with an instruction execution system such as a computer/processor based system or other system that can fetch or obtain the logic from the computer-readable medium and execute the instructions contained therein. In the context of this document, a "computer-readable medium" can be any medium that can contain, store, or maintain the gamut mapping logic 223 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A method for color processing, comprising the steps of:
   defining a composite color space in a memory of a computer system, the composite color space having a number of color space portions and a number or transition portions between adjacent ones of the color space portions;
   converting an input color space representation of a color into a composite color space representation of the color in the computer system; and
   gamut mapping the color in the composite color space after the color is converted into the composite color space representation to obtain a representation of the color in the composite color space that is reproducible by an output device.

2. The method of claim 1, wherein the step of defining the composite color space, further comprises the step of defining each of the color space portions as a portion of a predefined color space.

3. The method of claim 1, wherein the step of defining the composite color space further comprises the step of defining a color space within each of the transition portions as a hybrid of the color space portions adjacent thereto.

4. The method of claim 1, wherein the step of converting an input color space representation of the color into the composite color space representation of the color in the computer system further comprises the steps of:

defining a number of color space conversions associated with a respective number of hue angle ranges to convert the input color space representation of the color into the composite color space representation of the color;

identifying one of the color space conversions corresponding to a hue angle associated with the color; and converting the input color space representation to the composite color space representation of the color based on the respective color space conversion.

5. The method of claim 4, wherein the step or converting the input color space representation to the composite color space representation of the color based on the respective color space conversion further comprises the step of calculating the composite color space representation in one of the transition portions as a weighted sum of the color space representations of adjacent ones of the color space portions.

6. A Computer program embodied on a computer readable medium for color processing, comprising:

logic to define a composite color space, the composite color space having a number of color space portions and a number of transition portions between adjacent ones of the color space portions;

logic to convert an input color space representation of a color into a composite color space representation of the color; and logic to perform gamut mapping of the color in the composite color space after the color is converted into the composite color space representation to obtain a representation of the color in the composite color space that is reproducible by an output device.

7. The computer program embodied on the computer readable medium of claim 6, wherein the logic to define the composite color space, further comprises logic to employ a portion of a predefined color space as each of the color space portions.

8. The computer program embodied on the computer readable medium of claim 6, wherein the logic to define the composite color space further comprises logic to define a color space within each of the transition portions as a hybrid of the color space portions adjacent thereto.

9. The computer program embodied on the computer readable medium of claim 6, wherein the logic to convert the input color space representation of the color into the composite color space representation of the color further comprises:

logic to define a number of color space conversions associated with a respective number of hue angle ranges to convert the input color space representation of the color into the composite color space representation of the color;

logic to identify one of the color space conversions corresponding to a hue angle associated with the color; and logic to convert the Input color space representation to the composite color space representation of the color using the respective color space conversion.

10. The computer program embodied on the computer readable medium of claim 9, wherein logic to convert the input color space representation to the composite color space representation of the color based on the respective color space conversion further comprises logic to calculate the composite color space representation in one of the transition portions as a weighted sum of the color space representations of adjacent ones of the color space portions.

11. A system for color processing, comprising:

a processor circuit having a processor and a memory;

logic stored on the memory and executable by the processor to define a composite color space, the composite color space having a number of color space portions and a number of transition portions between adjacent ones of the color space portions;

logic stored on the memory and executable by the processor to convert an input color space representation of a color into a composite color space representation or the color; and logic stored on the memory and executable by the processor to perform gamut mapping of the color in the composite color space after the color is converted into the composite color space representation to obtain a representation of the color in the composite color space that is reproducible by an output device.

12. The system of claim 11, wherein the logic stored on the memory and executable by the processor to define the composite color space, further comprises logic stored on the memory and executable by the processor to employ a portion of a predefined color space as each of the color space portions.

13. The system of claim 11, wherein the logic stored on the memory and executable by the processor to define the composite color space further comprises logic stored on the memory and executable by the processor to define a color space within each of the transition portions as a hybrid of the color space portions adjacent thereto.

14. A system for color processing, comprising:

means for defining a composite color space in a memory of a computer system, the composite color space having a number of color space portions and a number of transition portions between adjacent ones of the color space portions;

means for converting an input color space representation of a color into a composite color space representation of the color in the computer system; and means for gamut mapping the color in the composite color space after the color is converted into the composite color space representation to obtain a representation of the color in the composite color space that is reproducible by an output device.

15. The system of claim 14, wherein the means for defining the composite color space, further comprises means for defining each of the color space portions as a portion of a predefined color space.

16. The system of claim 14, wherein the means for defining the composite color space further comprises means for defining a color space within each of the transition portions as a hybrid of the color space portions adjacent thereto.

* * * * *